W. H. MUZZY.
REGISTERING SCALE.
APPLICATION FILED MAY 15, 1905.
1,047,685.
Patented Dec. 17, 1912.
3 SHEETS—SHEET 1.
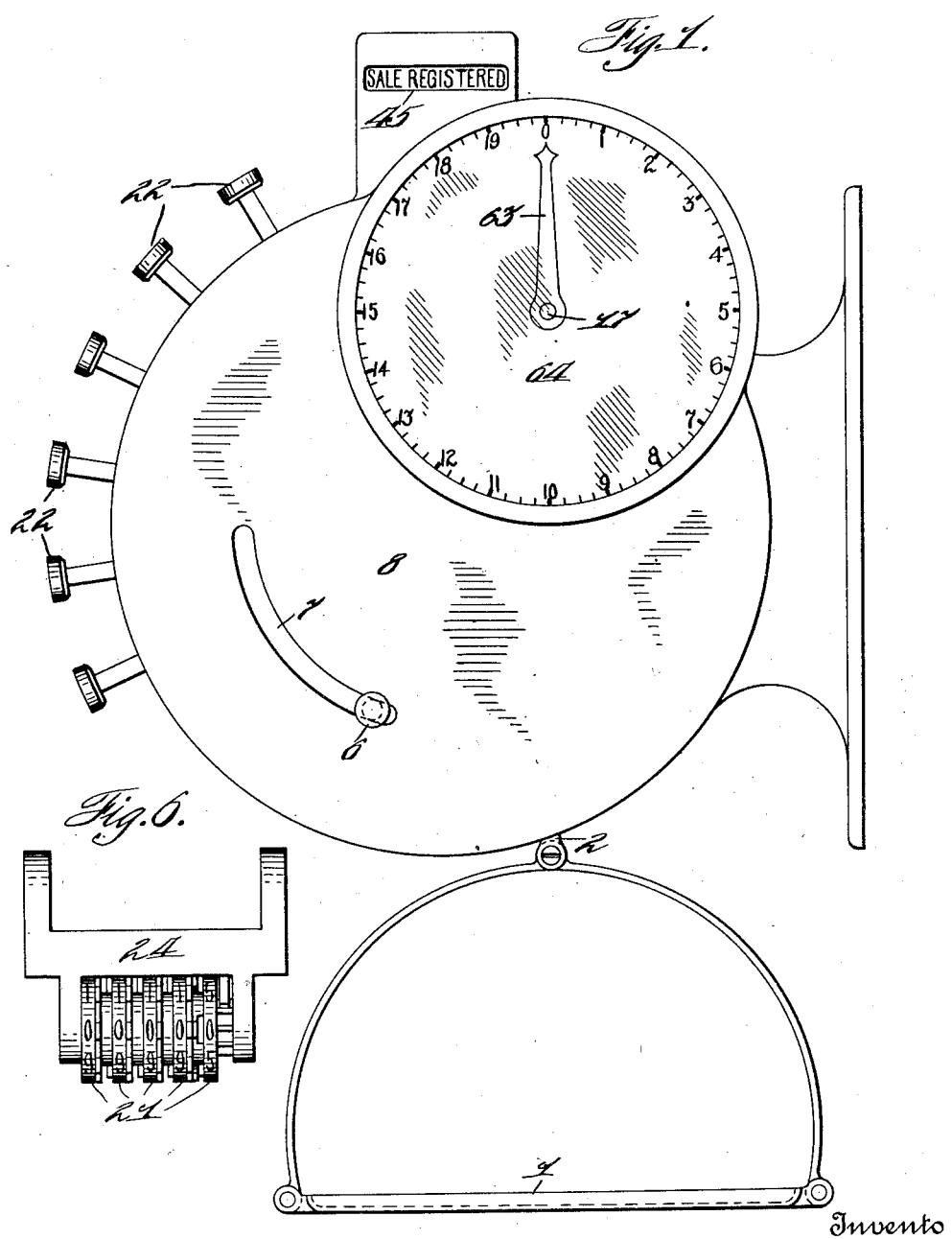

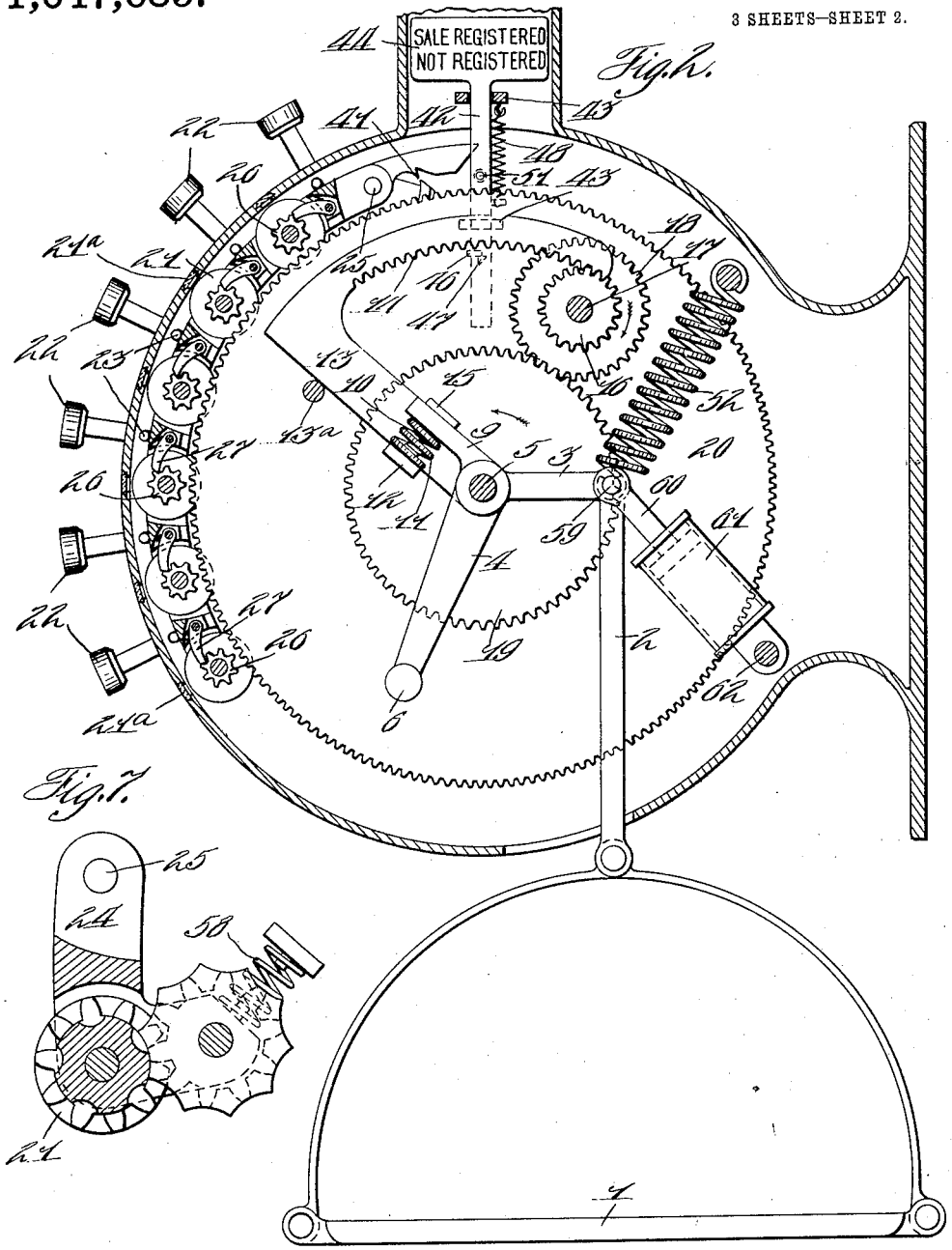

W. H. MUZZY.
REGISTERING SCALE.
APPLICATION FILED MAY 15, 1905.
1,047,685.
Patented Dec. 17, 1912.
3 SHEETS—SHEET 3.
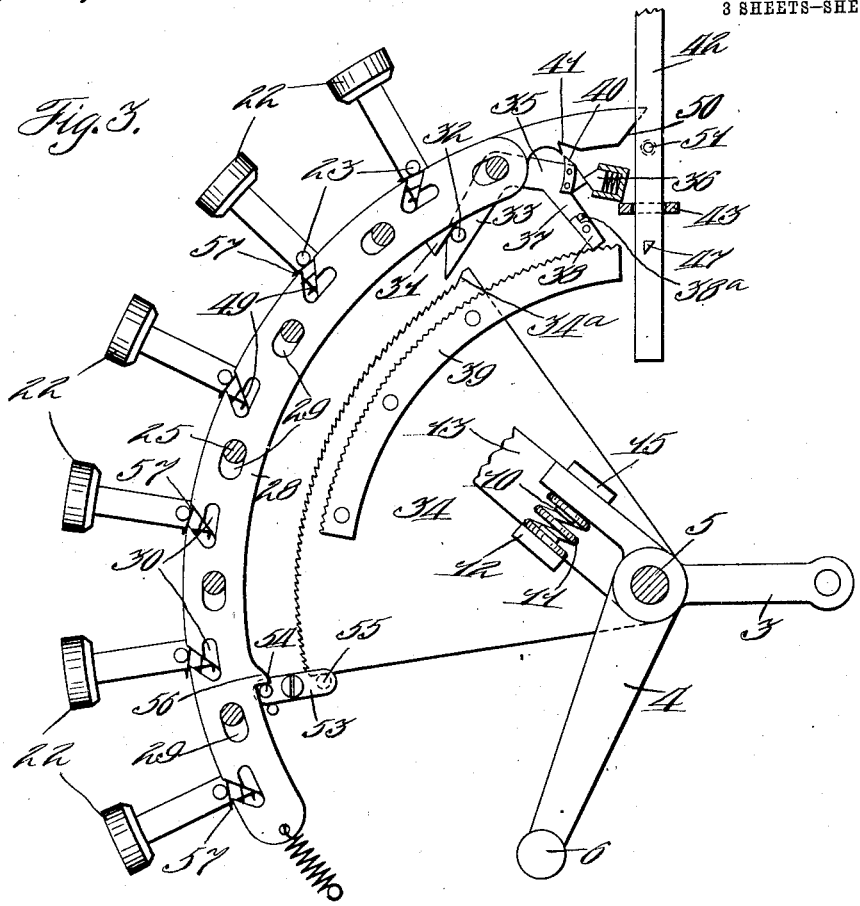
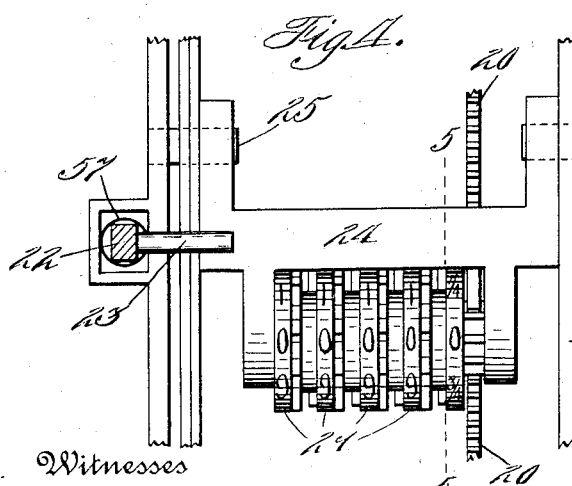
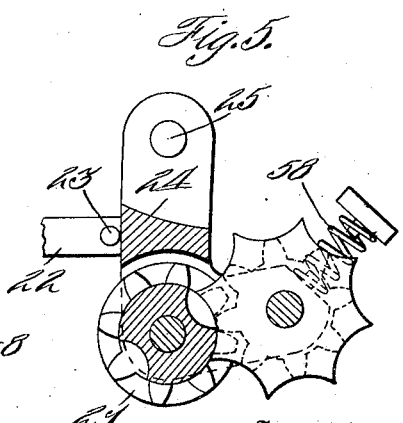
Witnesses
Inventor

UNITED STATES PATENT OFFICE.

WILLIAM H. MUZZY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

REGISTERING-SCALE.

1,047,685.   Specification of Letters Patent.   Patented Dec. 17, 1912.

Application filed May 15, 1905. Serial No. 260,440.

*To all whom it may concern:*

Be it known that I, WILLIAM H. MUZZY, a citizen of the United States, residing at Dayton, in the county of Montgomery and State of Ohio, have invented certain new and useful Improvements in Registering-Scales, of which I declare the following to be a full, clear, and exact description.

This invention relates to improvements in scales and has more particular relation to improvements in recording or registering scales.

The principal object of the invention is to provide a scale with a plurality of registers representing different classes of goods, each one of which is arranged to be brought into engagement with a common registering element that is given a differential movement in proportion to the weight of the article, so that the weight of said article may be registered upon its respective counter.

Another object of this invention is to provide an indicator which shows the customer whether the scale has been properly operated or not, thereby preventing false registration or manipulation by an attendant.

Another object of the invention is to provide a locking device which prevents the weighing of a second article until the weight of the previous article has been completely registered.

With these and incidental objects in view the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a front elevation of my improved scale and register. Fig. 2 represents a transverse section through the same. Fig. 3 represents an enlarged detail view of the latching detent for the keys and means for releasing the same. Fig. 4 represents an enlarged detail front elevation of one of the counters. Fig. 5 represents a transverse section through one of the counters taken on the line 5—5 of Fig. 4, and Figs. 6 and 7 represent detail front elevation and section of a modified form of counter.

These drawings show a registering scale having oscillatory gear elements, moved in one direction by the weight of articles and returned to normal position by a spring, and if necessary by the aid of a manually operated lever. Each forward movement, as usual, serves to rotate an indicating pointer to indicate weight but the return movement is utilized to actuate a desired one of a plurality of registering devices thereby accumulating the totals of weights or values of articles weighed. The registering devices are all normally out of operative relation with the gear elements but may be manually adjusted to operative relation when the weighing mechanism is at rest in its moved position. An indicating device is provided operating to indicate whether or not a registering device is in operative relation with the register actuator during the return of the weighing mechanism.

Referring to Fig. 2, 1 represents the platform of the scale; 2 a link connecting the platform with a supporting arm 3, which is integral with an arm 4 made fast to a transverse shaft 5 and extending downward. The lower end of this arm 4 is provided with a handle 6 that extends through an opening 7 formed in the casing 8, (see Fig. 1). An arm 9 integral with the arm 3 carries at its forward end a pin 10, which is surrounded by one end of a compression spring 11, the other end of said spring abutting against a flange 12 formed upon an arm 13, which carries a segmental rack 14. The arm 13 is formed with a flange 15 similar to flange 12 and which overlaps the arm 9, so that any rearward movement of the said arm 9 will be imparted to the arm 13. The rack 14 engages a pinion 16, which is secured to a short shaft 17 that extends through the casing 8. Made fast to the pinion 16 is a larger pinion 18, which latter pinion meshes with a gear 19 loosely mounted upon the shaft 5. Secured to this gear 19 is a larger gear wheel 20 by which the wheels 21 of the counter or accounting device are operated. The gear 19 is twice the diameter of the pinion 18 so that a complete revolution of the latter will turn the gears 19 and 20 a one-half revolution. The gear 20 is provided with 160 teeth so that a one-half revolution of the same will move 80 teeth past a given point, which will be sufficient to register twenty pounds in fractions of a quarter of a pound upon the register which is thrown into engagement with said wheel 20. The counters or accounting devices are controlled by a series of keys 22 suitably mounted in the casing and provided with laterally extending pins 23, which overlap the pivoted counter frames 24, so that by depressing any key its respective counter will be rocked about its trunnions 25 into engagement with the operating wheel 20. The first counter wheel of each counter is provided with a pinion 26 which meshes with the aforesaid wheel 20 so that the movement of the latter is imparted to the counter wheels 21. Pawls 27 mounted in the counter frame engage with the pinions 26 and prevent retrograde movement. The first wheel of each counter as shown in Fig. 4 is provided with duplicate sets of characters which represent the fractions of a pound in quarters. Upon each revolution of this wheel a transfer is made to the next higher wheel by the well known form of "Geneva stop" transfer mechanism as shown in Fig. 5. The figures upon the various counters may be read through the openings 21ª formed in the casing 8 and in which any suitable transparent material may be inserted. Any key 22 when depressed is latched in its depressed position by a spring-drawn detent 28. This detent is provided with elongated slots 29 through which the pivot pins 25 of the counter frames extend to form a guide therefor. Adjacent to this detent is a slide 30 which has a lug 31 arranged to engage a pin 32 mounted upon a pawl 33, and force said pawl into engagement with a segmental ratchet plate 34 upon the depressing of any one of the keys 22, and thus insuring a full return of said ratchet before another weighing operation can be performed. This segmental ratchet 34 is made fast to one end of the shaft 5, the other end of which carries the operating arm 4. The pawl 33 is of a bell crank formation and its arm 35 engages with a beveled spring-plunger-pin 36, and is thus held in either of its adjusted positions. Extending down from the arm 35 is an arm 37, which is provided at its lower end with a wiper pawl 38 which engages with a segmental ratchet plate 39 made fast to the ratchet plate 34. This pawl is prevented from moving but in one direction by a pin 38ª on the arm 37. As the ratchet 34 moves forward by the drawing down of the platform 1, the pawl 38 will ride idly over the plate 39, but the instant that the plate 39 starts to return it will force the arm 37 upward carrying the lower edge of the arm 35 to the upper side of the beveled plunger 36. This movement will also bring the pawl 33 into engagement with the teeth of the ratchet plate 34 which will necessitate a full return of all the parts until a lug 34ª on plate 34 strikes the pawl 33 and returns the parts to their normal positions. The upward movement of arm 35 will carry a lug 40 formed on said arm into a recess 41 formed in the slide 30, thus preventing any movement of said slide. The object of this is to prevent a clerk partially returning the register operating wheel and then depressing a key which would enable him to indicate one amount and register another. If he once permits the parts to start back toward normal position he cannot thereafter throw in a counter. In addition to this, the machine is provided with an indicator which indicates to the customer whether the machine has been properly operated or not. This indicator comprises a standard 42 which passes through guides 43 and is provided with a tablet 44, upon which is printed any suitable wording such as "Sale registered" and "Not registered." If the attendant depresses one of the keys the pin 23 formed thereon will engage with one of the inclined slots 49 formed in the slide 30 and move the slide forward. The upper end of the slide 30 has a beveled face 50 which will engage an anti-friction roller 51 upon the standard 42 of the indicator and move the same downward against the tension of its spring 48 and hold it so. The standard 42 of the indicator is provided with a beveled lug 47 while the gear 20 is provided with a lug 46. When the parts return to their normal positions the lug 46 projects over the lug 47 and thus holds the indicator in its "sale registered" position after the beveled end of the slide 30 has passed free of the pin 51 upon the release of the depressed key. Just as soon, however, as the parts again move forward a very slight distance the indicator is again released to disclose the sign "Not registered" and the proper "Sale registered" sign is not brought into view unless one of the counter keys is thereafter depressed. The return movement of the arm 13 is limited by stationary pin 13ª, projecting from the casing. Spring 11 interposed between the arm 9 and the flange 12 formed upon the arm 13 is of sufficient strength to return the operating gear to normal position without being compressed. This spring, however, allows an additional movement of the operating handle 6 after the gear is returned, the purpose of which I will now describe.

Pivoted upon the frame of the machine is a short lever 53, which is equipped with pins 54 and 55. The pin 54 rests under an ear 56 formed on the latching detent 28. The pin 55 is arranged to be engaged by the segmental ratchet 34 during the additional movement of the operating handle 6, and thus rock the arm 53 about its pivotal point, and thereby raising the latching detent 28 to release the key, which is returned to normal position by spring 57, surrounding the same. This extra movement releases the counter frame and throws out the "full stroke" device ready for a new operation. The counter frame is returned to normal position by a compression spring 58 as shown in Fig. 5.

Pin 59 which secures the link 2 and the arm 3 has fastened to its outer end a piston rod 60 which extends into a dash-pot 61, which is pivotally mounted upon a shaft 62, the object of which is to prevent an excessive movement of the scale pointer 63, which pointer is secured to the outer end of the shaft 17, the inner end of said shaft having secured to it the pinion 16. It will thus be seen that any movement of the pinion 16 will move the pointer 63 over the dial 64, and thereby indicate the weight of the article placed upon the platform 1.

In operation a commodity to be sold is placed on the scale pan 1, depressing it, and thus through arm 13 rotating the gear wheel 20 and setting the indicating hand 63. Depression of a key 22 will engage the corresponding totalizer with the gear wheel 20, when a restoration of the scale parts to normal position by spring 52 or handle 6 will cause the amount of the weight to be added on the designated totalizer.

It will be observed that I have provided the present machine with six counters, but it will, of course, be understood that any desired number may be employed without departing from the spirit of this invention. These counters may be utilized for keeping records of different classes of goods such as coffee, tea, sugar, spices, etc. In the sale of such commodities as are to be weighed this scale provides means for keeping track of the stock as well as furnishing the means for computing the amount of cash that should be found in the cash-drawer. For example, if one day's business shows the sale of 50 lbs. of sugar, 15 lbs. of coffee, 10 lbs. of tea, etc., it will be only a matter of short calculation to ascertain the amount of money that should be in the cash-drawer to represent this definite amount of goods sold at the price prevailing during that day. Further, by permitting the counters to run from day to day, the proprietor knowing that he has only 500 lbs. of sugar in stock, can ascertain at a glance at any time, just how much sugar he has remaining in stock and will therefore know when it is necessary to order a fresh supply. It will further be understood that should this scale be employed for the weighing of commodities having a certain fixed price, that the counting wheels could be so marked that the registration of so many pounds would not show as pounds, but would be indicated in dollars and cents. Again it will be understood that this multiple counter scale may be employed for registering the amounts in cash of articles selling at different prices. For instance, at the counter at which the scale is located there might be articles selling for six different prices represented by the six counter keys. The upper key might represent articles selling at 20¢ a pound, the second key, articles selling at 25¢ a pound, and so on. Should an article weighing 10 pounds be placed upon the scale and the 20¢ key be depressed the return movement of the register-operating wheel would actuate the first wheel of the counter a distance of 40 teeth. The transfer positions upon this particular counter would be so located that a movement equal to 40 teeth would result in the registration of $2.00. In other words, each tooth of the pinion of the first counter wheel would represent a value of 5¢, and the transfer to the second wheel would take place upon the movement of every second tooth, while the markings on the first wheel would be 5 0 5 0 alternately. The remaining counters would be utilized in substantially the same way excepting the transfer teeth would be located at different points according to the price per pound represented by the counter. The marking and construction of a counter for registering such amounts at 20¢ a pound is clearly shown in Figs. 6 and 7.

By the phrase accounting device or accounting mechanism used in the specification and claims is meant to cover broadly any device or mechanism upon which may be entered and retained a plurality of transactions.

While the form of mechanism here shown and described is admirably adapted to fulfil the objects primarily stated, it is to be understood that it is not desired to confine the invention to the one form of embodiment here disclosed, for it is susceptible of embodiment in various forms all coming within the scope of the claims which follow.

Having thus described my invention what I claim as new and desire to secure by Letters Patent is:

1. In a registering scale, the combination with a weighing mechanism, of a counter actuator movable with said weighing mechanism, a series of independent accumulating counters, and means for bringing any one of said counters into connection with the counter actuator.

2. In a registering scale, the combination with a weighing mechanism, of a plurality of independent counters normally disconnected from said mechanism, and means for actuating a desired counter by the return movement of the weighing mechanism.

3. In a registering scale, the combination with a weighing mechanism, of a plurality of independent counters, means for actuating the counters by a certain movement of the weighing mechanism, and means for preventing a counter being brought into connection with the register operating mechanism after the register operating movement of the latter has been started.

4. In a registering scale, the combination of a weighing mechanism, a plurality of independent accumulating counters, means for connecting any one of the counters with the weighing mechanism, and means for thereafter causing the weighing mechanism to actuate the selected counter.

5. In a registering scale, the combination with a weighing mechanism, of an index pointer connected to the same, a series of independent counters, and means for bringing any one of the counters into connection with the weighing mechanism after the index pointer has taken up its indicating position, and thereafter actuating the counter.

6. In a registering scale, the combination with a weighing mechanism, of a counter operating rack movable therewith, and a plurality of independent counters any one of which may be brought into connection with the rack to be operated thereby.

7. In a registering scale, the combination with a spring balance weighing mechanism, of counter operating devices connected thereto, and a plurality of independent counters any one of which may be brought into connection with said operating devices.

8. In a registering scale, the combination with a weighing mechanism, of counter operating devices connected thereto, a counter arranged to be brought into connection with said operating devices, and means for compelling a complete operation of the counter according to the weight of the article being weighed before it can be disengaged.

9. In a registering scale, the combination with a spring balance weighing mechanism, of a counter operating device connected thereto, a counter normally out of connection with the operating device, means for bringing the counter into connection with said operating device, and means for compelling a complete registration on said counter of the article weighed.

10. In a registering scale, the combination with a weighing mechanism, of a counter, counter operating devices controlled by said weighing mechanism, means for moving said counter into operative relation with said counter operating devices, a detent for holding said counter in operative relation with said counter operating devices, means for returning said operating devices to normal positions, and mechanism for operating the detent by the said returning means.

11. In a registering scale, the combination with a weighing mechanism, of counter operating devices moving therewith, a counter, means for bringing the counter into connection with the operating devices after the weighing is complete to be actuated by the return of the parts, and an indicator for indicating the position of the counter.

12. In a registering scale, the combination with a weighing mechanism, counter operating devices movable therewith, a counter operable by the movement of said devices in one direction, and means for preventing the counter being brought into connection with the operating devices after their movement in operating direction has started.

13. In a registering scale, the combination with a weighing mechanism, of counter operating devices, a counter arranged to be operated by the return of the operating devices, means for compelling a full return of said devices, and mechanism for bringing said latter means into operation and preventing the connection of the counter with the operating devices after the return movement of the latter has commenced.

14. In a registering scale, the combination with a weighing mechanism, of counter operating devices controlled thereby, an indicator operated when the counter is brought into connection with the operating devices, and means for holding the indicator in position after the counter is released.

15. In a registering scale, the combination with a spring balance weighing mechanism, of an accounting mechanism, means for bringing the accounting mechanism into connection with the weighing mechanism at will, and an indicator for indicating whether this relation was established or not for a certain transaction.

16. In a registering scale, the combination with a differentially movable spring balance mechanism, of a handle for positively returning the same to normal position, a counter, means for operating the counter an extent proportional to the amount weighed by the return movement of the weighing mechanism, and means for compelling a full return movement before the scale can be again used.

17. In a registering scale, the combination with a weighing mechanism, of a plurality of independent counters, counter operating mechanism controlled by the weighing mechanism, a detent for holding any counter into connection with the operating mechanism, and means connected with the weighing mechanism for operating the detent.

18. In a machine of the class described, the combination with a plurality of accounting mechanisms, of a weighing mechanism for operating said accounting mechanisms common thereto, and means for determining which one of said accounting mechanisms shall be operated by the weighing mechanism.

19. In a machine of the class described, the combination with a totalizer, of a weighing mechanism and connections for registering upon the totalizer the amounts weighed, and an indicator driven by said connections to display whether the amount weighed has been registered upon the totalizer.

20. In a machine of the class described, the combination with a plurality of totalizers, of a weighing mechanism for operating said totalizers and common thereto, keys, and mechanism operated by the keys by means of which the totalizers may be operatively connected with the weighing mechanism.

In testimony whereof I affix my signature, in the presence of two witnesses.

WILLIAM H. MUZZY.

Witnesses:
W. M. McCarthy,
E. S. Williss.